(12) United States Patent
Hiraiwa et al.

(10) Patent No.: US 10,847,814 B2
(45) Date of Patent: Nov. 24, 2020

(54) SOLID OXIDE FUEL CELL

(71) Applicant: SUMITOMO ELECTRIC INDUSTRIES, LTD., Osaka (JP)

(72) Inventors: Chihiro Hiraiwa, Itami (JP);
Masatoshi Majima, Itami (JP);
Takahiro Higashino, Itami (JP);
Hiromasa Tawarayama, Itami (JP);
Kazunari Miyamoto, Itami (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 140 days.

(21) Appl. No.: 16/073,428

(22) PCT Filed: Jan. 23, 2017

(86) PCT No.: PCT/JP2017/002121
§ 371 (c)(1),
(2) Date: Jul. 27, 2018

(87) PCT Pub. No.: WO2017/130903
PCT Pub. Date: Aug. 3, 2017

(65) Prior Publication Data
US 2019/0036131 A1 Jan. 31, 2019

(30) Foreign Application Priority Data
Jan. 29, 2016 (JP) .................. 2016-016682

(51) Int. Cl.
*H01M 8/0271* (2016.01)
*H01M 8/0273* (2016.01)
(Continued)

(52) U.S. Cl.
CPC ....... *H01M 8/0271* (2013.01); *H01M 8/0232* (2013.01); *H01M 8/0247* (2013.01);
(Continued)

(58) Field of Classification Search
CPC ............. H01M 8/0271; H01M 8/0273; H01M 8/0247; H01M 8/1246; H01M 8/0232;
(Continued)

(56) References Cited

U.S. PATENT DOCUMENTS

| 2004/0028994 A1* | 2/2004 | Akikusa | ............ C22C 5/08 |
| | | | 429/480 |
| 2007/0065707 A1* | 3/2007 | Zerfass | ............... H01M 8/028 |
| | | | 429/469 |

(Continued)

FOREIGN PATENT DOCUMENTS

| JP | 2007-317525 A | 12/2007 | |
| WO | WO2014/045530 | * 3/2014 | ............. H01M 8/02 |

OTHER PUBLICATIONS

Yoo and Lim. "Performance and stability of proton conducting solid oxide fuel cells based on ytrrium-doped barium cerate-zirconate thin-film electrolyte." Journal of Power Sources 229 (2013) 48-57. (Year: 2013).*

*Primary Examiner* — Michael L Dignan
(74) *Attorney, Agent, or Firm* — Faegre Drinker Biddle & Reath LLP

(57) ABSTRACT

Provided is a solid oxide fuel cell including a flat-plate-shaped cell structure including a cathode, an anode, and an electrolyte layer containing a solid oxide, a frame-shaped sealing member disposed so as to surround a periphery of the cathode, the sealing member having a larger outside diameter than the cathode, a first pressing member and a second pressing member that hold the sealing member therebetween, and a flat-plate-shaped cathode current collector adjacent to the cathode, the flat-plate-shaped cathode current collector being formed of a porous metal body having a three-dimensional mesh-like skeleton, in which the cathode current collector has a peripheral portion that is not opposite the anode, the outer edge portion of a main surface of the
(Continued)

sealing member adjacent to the anode faces the first pressing member, the inner edge portion of the main surface of the sealing member adjacent to the anode faces the peripheral portion of the electrolyte layer, the outer edge portion of a main surface of the sealing member opposite the main surface of the sealing member adjacent to the anode is opposite the second pressing member with the peripheral portion of the cathode current collector, and the inner edge portion of the main surface of the sealing member opposite the main surface of the sealing member adjacent to the anode faces the body portion of the cathode current collector other than the peripheral portion of the cathode current collector.

18 Claims, 4 Drawing Sheets

(51) Int. Cl.
| | | |
|---|---|---|
| | *H01M 8/0247* | (2016.01) |
| | *H01M 8/1246* | (2016.01) |
| | *H01M 8/0232* | (2016.01) |
| | *H01M 8/1213* | (2016.01) |
| | *H01M 8/12* | (2016.01) |
| | *H01M 8/124* | (2016.01) |

(52) U.S. Cl.
CPC ........... *H01M 8/0273* (2013.01); *H01M 8/12* (2013.01); *H01M 8/1213* (2013.01); *H01M 8/1246* (2013.01); *H01M 2008/1293* (2013.01); *Y02E 60/50* (2013.01)

(58) Field of Classification Search
CPC ................. H01M 8/1213; H01M 8/12; H01M 2008/1293; Y02E 60/525
See application file for complete search history.

(56) References Cited

U.S. PATENT DOCUMENTS

| | | | |
|---|---|---|---|
| 2011/0039187 A1* | 2/2011 | Bae | H01M 8/2457 429/497 |
| 2011/0171554 A1* | 7/2011 | Hayashi | H01M 8/12 429/456 |
| 2011/0305976 A1* | 12/2011 | Tanahashi | H01M 8/0273 429/535 |
| 2014/0087206 A1* | 3/2014 | Okuno | H01M 4/80 428/613 |
| 2014/0212784 A1* | 7/2014 | Okuyama | H01M 8/0206 429/465 |
| 2015/0255812 A1* | 9/2015 | Uwani | H01M 8/242 429/458 |
| 2015/0318563 A1* | 11/2015 | Kuribayashi | H01M 8/0206 429/482 |
| 2018/0123143 A1* | 5/2018 | Sato | H01M 8/0247 |

* cited by examiner

SOLID OXIDE FUEL CELL

TECHNICAL FIELD

The present invention relates to a solid oxide fuel cell.

The present application claims priority to Japanese Patent Application No. 2016-016682 filed in the Japan Patent Office on Jan. 29, 2016, the entire contents of which is incorporated herein by reference.

BACKGROUND ART

Fuel cells are devices that generate electricity through electrochemical reactions between a fuel such as hydrogen and an oxidant (for example, air). Fuel cells can directly convert chemical energy into electricity and thus have high power generation efficiency. In particular, in the case of solid oxide fuel cells, which operate at temperatures of 1,000° C. or lower, high reaction rates are provided. All components of cell structures thereof are solid; thus, solid oxide fuel cells are easy to handle.

When an anode is supplied with fuel, the fuel is oxidized at the anode, and an oxidation reaction that releases protons and electrons occurs. When a cathode is supplied with an oxidant, oxygen molecules are dissociated and ionized at the cathode. Usually, channels for the supply or discharge thereof are isolated by a sealing member in order not to mix the fuel and the oxidant together (see PTL 1).

CITATION LIST

Patent Literature

PTL 1: Japanese Unexamined Patent Application Publication No. 2007-317525

SUMMARY OF INVENTION

An aspect of the present invention relates to a solid oxide fuel cell including a flat-plate-shaped cell structure including a cathode, an anode including a peripheral portion that does not face the cathode and having a larger outside diameter than the cathode, and an electrolyte layer interposed between the cathode and the anode, the electrolyte layer including a peripheral portion that does not face the cathode, the electrolyte layer containing a solid oxide; a frame-shaped sealing member disposed so as to surround a periphery of the cathode, the sealing member having a larger outside diameter than the cathode; a first pressing member and a second pressing member that hold the sealing member therebetween; and a flat-plate-shaped cathode current collector adjacent to the cathode, the flat-plate-shaped cathode current collector being formed of a porous metal body having a three-dimensional mesh-like skeleton, in which the cathode current collector has a peripheral portion that is not opposite the anode, the outer edge portion of a main surface of the sealing member adjacent to the anode faces the first pressing member, the inner edge portion of the main surface of the sealing member adjacent to the anode faces the peripheral portion of the electrolyte layer, the outer edge portion of a main surface of the sealing member opposite the main surface of the sealing member adjacent to the anode is opposite the second pressing member with the peripheral portion of the cathode current collector, and the inner edge portion of the main surface of the sealing member opposite the main surface of the sealing member adjacent to the anode faces the body portion of the cathode current collector other than the peripheral portion of the cathode current collector.

DESCRIPTION OF EMBODIMENTS

Problem to be Solved by Disclosure

Figure 7:
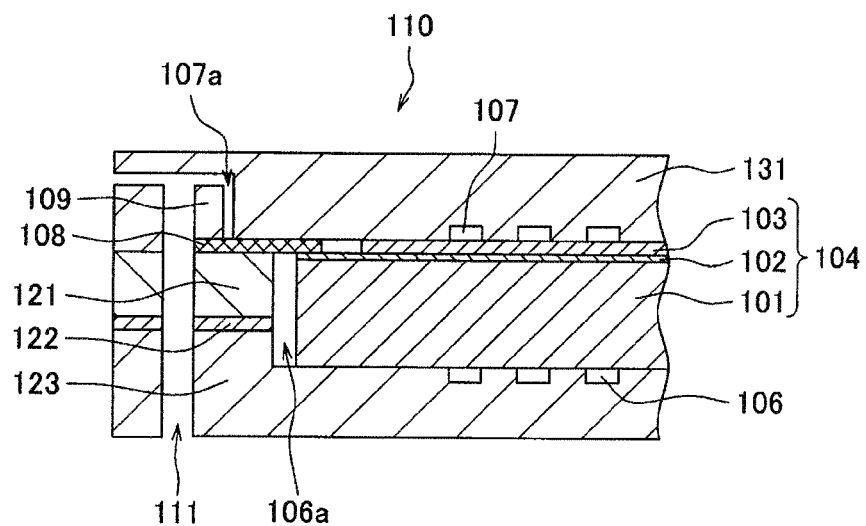
FIG. 7 is a schematic cross-sectional view illustrating the structure of a main portion of a conventional fuel cell.

As illustrated in FIG. 7, usually, a sealing member 108 is held between a pair of plate-like interconnectors (123 and 131) arranged on both sides of a cell structure 104. Spacers (109 and 121) and an insulating member 122 are interposed between the sealing member 108 and the interconnector 123 or 131, in some cases. A cavity is provided between the interconnectors 123 and 131. The cell structure 104 is disposed in the cavity. Gaps are usually provided between the cell structure 104 and each of the interconnectors (123 and 131) or each of the spacers (109 and 121). In FIG. 7, a gap 106a and a gap 107a communicate with a fuel channel 106 and an oxidant channel 107, respectively. The oxidant channel 107 is supplied with an oxidant from a manifold 111.

The fuel channel 106 is supplied with fuel from a manifold (not illustrated).

The interconnectors (123 and 131) are pressed from the outside to come into close contact with the sealing member 108. This ensures the isolation (sealing properties) between the fuel channel 106 and the oxidant channel 107. The interconnectors (123 and 131) need to be brought into close contact with the cell structure 104 in view of current collection characteristics. Thus, the thickness of each of the spacers (109 and 121) and the shape of each of the interconnectors (123 and 131) are strictly controlled in consideration of the thickness of the cell structure 104.

Figure 8:
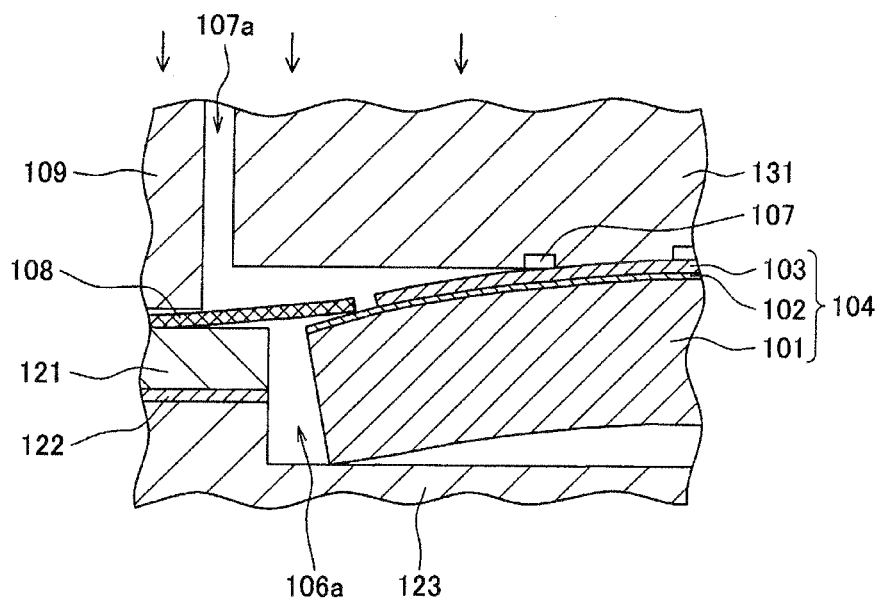
FIG. 8 is a schematic cross-sectional view illustrating the structure of a main portion of another conventional fuel cell.

The cell structure 104 is formed through, for example, firing steps using an anode material containing a nickel (Ni) component serving as a catalyst and a solid oxide, an electrolyte material containing a solid oxide, and a cathode material containing a metal oxide. In the case of an anode-supported cell, after the anode material containing nickel oxide (NiO) and the solid oxide is fired to form an anode 101, the electrolyte material is applied to a surface thereof and fired to form a composite member of an electrolyte layer 102 and the anode 101. Next, the cathode material is applied to the electrolyte layer 102 of the resulting composite member and fired to produce the cell structure 104 having a structure in which the anode 101, the electrolyte layer 102, and a cathode 103 are stacked in this order. Because the materials usually differ in expansion coefficient and shrinkage rate from one another, the resulting cell structure 104 suffers slight warpage. In the case of the cell structure 104 having a circular shape with a diameter of about 10 cm, for example, warpage on the order of several millimeters may occur. In FIG. 8, the cell structure 104 warps in such a manner that the middle portion of the cell structure 104 adjacent to the cathode 103 protrudes. The warpage mode of the cell structure 104 varies depending on the combinations of the materials of the anode 101, the electrolyte layer 102, and the cathode 103.

When the cell structure 104 warps, the cell structure 104 is in partial contact with the interconnectors (123 and 131) in an unloaded state. In FIG. 8, a middle portion of the cell structure 104 adjacent to the cathode 103 is in contact with the interconnector 131, and an outer edge portion of the cell structure 104 adjacent to the anode 101 is in contact with the interconnector 123. In this case, the interconnector 131 cannot be in close contact with the sealing member 108, thereby degrading sealing properties.

If an attempt is made to improve the sealing properties by firmly pressing the cell structure 104 in the thickness direction with the interconnectors (123 and 131), the cell structure 104 is broken, in some cases. When yttrium-doped barium cerate (BCY) or yttrium-doped barium zirconate (BZY) is used as a solid oxide, the cell structure 104 is particularly easily broken.

Advantageous Effects of Disclosure

According the present invention, a solid oxide fuel cell (SOFC) having good sealing properties is provided even if the cell structure is warped.

Description of Embodiments of Invention

Embodiments of the present invention are first listed and explained.

(1) A solid oxide fuel cell of the present invention includes a flat-plate-shaped cell structure including a cathode, an anode including a peripheral portion that is not opposite the cathode and having a larger outside diameter than the cathode, and an electrolyte layer interposed between the cathode and the anode, the electrolyte layer including a peripheral portion that does not face the cathode, the electrolyte layer containing a solid oxide; a frame-shaped sealing member disposed so as to surround a periphery of the cathode, the sealing member having a larger outside diameter than the cathode; a first pressing member and a second pressing member that hold the sealing member therebetween; and a flat-plate-shaped cathode current collector adjacent to the cathode, the flat-plate-shaped cathode current collector being formed of a porous metal body having a three-dimensional mesh-like skeleton. The cathode current collector has a peripheral portion that is not opposite the anode, the outer edge portion of a main surface of the sealing member adjacent to the anode faces the first pressing member, the inner edge portion of the main surface of the sealing member adjacent to the anode faces the peripheral portion of the electrolyte layer, the outer edge portion of a main surface of the sealing member opposite the main surface of the sealing member adjacent to the anode is opposite the second pressing member with the peripheral portion of the cathode current collector, and the inner edge portion of the main surface of the sealing member opposite the main surface of the sealing member adjacent to the anode faces the body portion of the cathode current collector other than the peripheral portion of the cathode current collector.

The porous metal body serving as the cathode current collector easily undergoes plastic deformation or elastic deformation (hereinafter, referred to simply as "deformation"). Thus, the cathode current collector is pressed from the outside with the pressing member to deform so as to follow the shape of the cell structure. Thus, even in the case of the cell structure is warped, the cell structure is in close contact with the cathode current collector without a load on the cell structure. The sealing member together with the easily deformable cathode current collector is held between the pressing members. Regardless of the amount of warpage of the cell structure, the sealing member is reliably pressed by the cathode current collector and the pressing member on the side of the anode and thus is in close contact with both the components. This results in improved current collection characteristics and improved sealing properties.

(2) The porous metal body constituting the cathode current collector preferably has a porosity of 90% or more and 99% or less. This is because the porous metal body is more easily deformable.

(3) The external dimension of the sealing member preferably is equal to or greater than the external dimension of the cathode current collector. This is because a phenomenon in which fuel or an oxidant leaks to another electrode through the electrolyte layer (cross leakage phenomenon) is easily inhibited.

(4) The solid oxide preferably has proton conductivity. Protonic ceramic fuel cells (PCFCs) can operate in an intermediate temperature range of, for example, 400° C. to 600° C. Thus, an easily deformable metal can be used as a material for the porous metal body.

(5) The solid oxide may contain a metal oxide having a perovskite structure, the metal oxide being represented by formula (1):

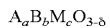

(where element A is at least one selected from the group consisting of Ba, Ca, and Sr, element B is at least one selected from the group consisting of Ce and Zr, element M is at least one selected from the group consisting of Y, Yb, Er, Ho, Tm, Gd, and Sc, $0.85 \leq a \leq 1$, $0.5 \leq b < 1$, $c = 1-b$, and $\delta$ represents an oxygen vacancy concentration). Such a solid oxide provides a relatively low-strength sintered body; however, according to the foregoing structure, the sealing properties can be improved without damaging the cell structure.

(6) The porous metal body preferably contains an alloy of nickel and tin because it is easily deformable. (7) In particular, tin preferably accounts for 5% to 30% by mass of the alloy in view of ease of deformation and strength.

Details of Embodiments of Invention

Embodiments of the present invention will be specifically described below. The present invention is not limited to the following description. The scope of the present invention is defined by the following claims and is intended to include any modifications within the scope and meaning equivalent to the scope of the claims.

Figure 1:
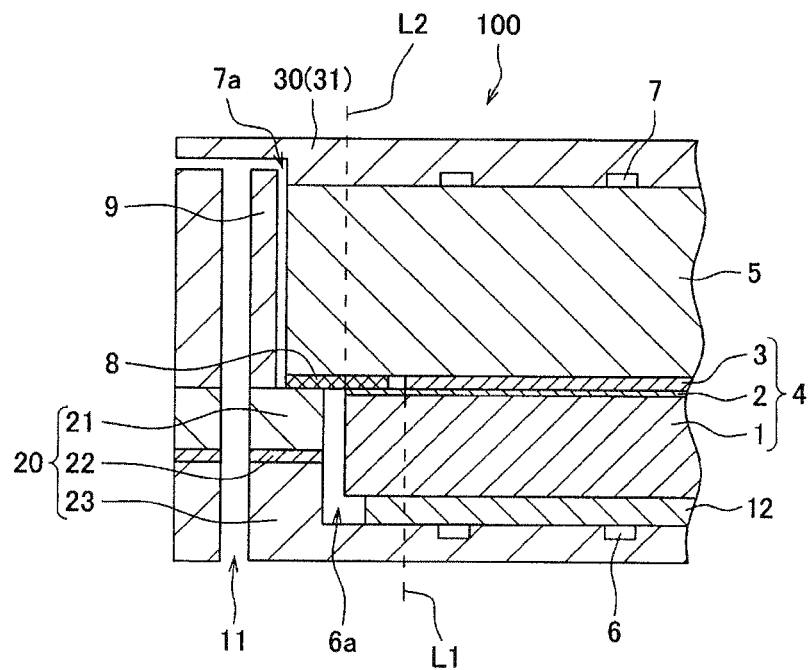
FIG. 1 is a schematic cross-sectional view illustrating a main portion of a fuel cell according to an embodiment of the present invention.
Figure 2:
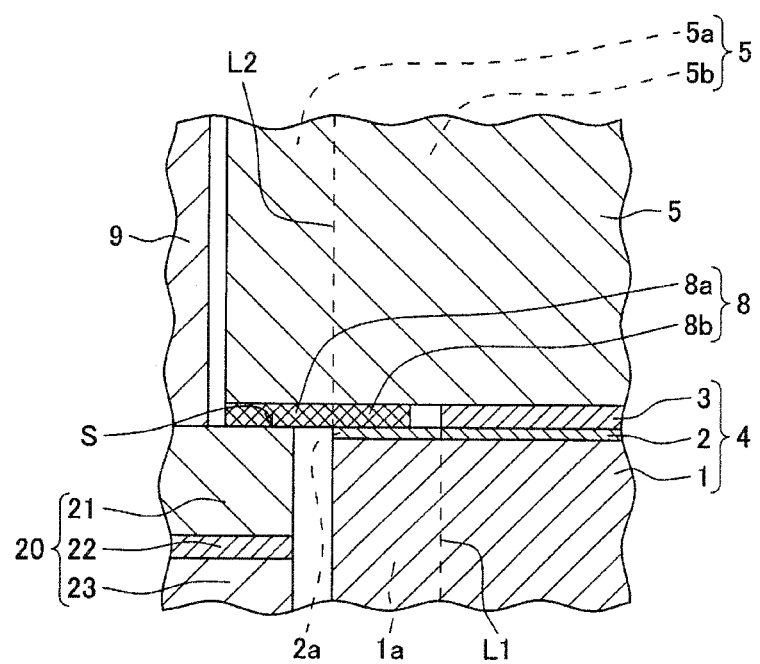
FIG. 2 is an enlarged cross-sectional view illustrating the main portion of the fuel cell illustrated in FIG. 1.

A solid oxide fuel cell (hereinafter, referred to simply as a "fuel cell") according to an embodiment will be described below with reference to FIGS. 1 and 2. FIG. 1 is a schematic cross-sectional view illustrating a main portion of a fuel cell according to an embodiment. FIG. 2 is an enlarged cross-sectional view illustrating the structure of the main portion illustrated in FIG. 1. The outer shapes of a cell structure, an interconnector, a sealing member, and a current collector included in the fuel cell when viewed in the thickness direction of the cell structure (the outer shapes in plan view) are not particularly limited and may each be, for example, a circle, an ellipse, a rectangle, or a polygon.

(Fuel Cell)

A fuel cell 100 includes a cell structure 4, a fuel channel 6 through which fuel passes, an oxidant channel 7 through which an oxidant passes, a frame-shaped sealing member 8 that isolates the fuel channel 6 and the oxidant channel 7 from each other, and a pair of pressing members (a first pressing member 20 and a second pressing member 30) that directly or indirectly hold the sealing member 8 therebetween. The oxidant channel 7 is supplied with an oxidant from a manifold 11. The fuel channel 6 is supplied with fuel from a manifold (not illustrated). In FIGS. 1 and 2, each of the channels is only partially illustrated.

The fuel channel 6 is used to supply the fuel to an anode 1 or to discharge the fuel unused and $N_2$, $CO_2$, or the like formed in a reaction from the anode 1. The oxidant channel 7 is used to supply the oxidant to a cathode 3 or to discharge water formed by a reaction, the oxidant unused, and so forth from the cathode 3. The fuel channel 6 communicates with a gap 6a between the anode 1 and the first pressing member 20. The oxidant channel 7 communicates with a gap 7a between a cathode current collector 5 and a spacer 9.

The cell structure 4 includes the anode 1, the cathode 3, and an electrolyte layer 2 that is interposed between the anode 1 and the cathode 3 and that contains a solid oxide. Each of the anode 1 and the cathode 3 has a flat-plate shape. The cell structure 4 also has a flat-plate shape.

The cell structure 4 illustrated in FIGS. 1 and 2 is what is called an anode-supported type. Thus, as illustrated in FIG. 2, the peripheral portion of the anode 1 serves as a first extension portion 1a that is not opposite the cathode 3. In each of FIGS. 1 and 2, the boundary between the first extension portion 1a of the anode 1 and the other portion is represented by a broken line L1.

The electrolyte layer 2 is disposed on almost the entire main surface of the anode 1 opposite the cathode 3.

Thus, the peripheral portion of the electrolyte layer 2 serves as a second extension portion 2a that faces the first extension portion 1a and that does not face the cathode 3. The boundary between the second extension portion 2a of the electrolyte layer 2 and the other portion is represented by the broken line L1, similarly to the boundary between the first extension portion 1a of the anode 1 and the other portion.

The flat-plate-shaped cathode current collector 5 is disposed adjacent to the cathode 3. As the cathode current collector 5, a porous metal body having a three-dimensional mesh-like skeleton is used. The cathode current collector 5 is disposed so as to extend in the planar direction of the cell structure 4 with respect to the cell structure 4. That is, the size of a main surface of the cathode current collector 5 is sufficiently larger than that of a main surface of the anode 1. Thus, the peripheral portion of the cathode current collector 5 serves as a third extension portion 5a that is not opposite the anode 1, and the middle portion of the cathode current collector 5 serves as a body portion 5b opposite the anode 1. In FIG. 2, the boundary between the third extension portion 5a and the body portion 5b of the cathode current collector 5 is represented by a broken line L2.

An anode current collector 12 may be disposed so as to be adjacent to the anode 1. The size of the anode current collector 12 in the direction of the main surface is not particularly limited. For example, the anode current collector 12 may be equal in size to the main surface of the anode 1 (i.e., the anode 1 and the anode current collector 12 are almost superimposed when viewed in plan), may be smaller in size than the main surface of the anode 1 (i.e., the periphery of the anode 1 extends outwardly to a position beyond the periphery of the anode current collector 12 when viewed in plan), or may be larger in size the main surface of the anode 1 (the periphery of the anode current collector 12 extends outwardly to a position beyond the periphery of the anode 1 when viewed in plan).

In a fuel cell according to the related art, the size of a current collector in the direction of a main surface thereof is usually set to be smaller than the size of electrodes (an anode and a cathode) in the direction of the main surface. This is because when the current collector is larger than the electrodes in the direction of the main surface, the total length of a fuel or oxidant channel is excessively long to lead to an increase in pressure drop.

In contrast, in the anode-supported-type cell structure 4 according to the embodiment, the size of the cathode current collector 5 adjacent to the cathode 3 in the direction of a main surface thereof is intentionally set to be larger than that of each of the anode 1 and the electrolyte layer 2 in the direction of the main surface to ensure good sealing properties. In this embodiment, as the cathode current collector 5, a porous metal body having a three-dimensional mesh-like skeleton is used. Because the porous metal body has a high porosity (for example, 90% or more and 99% or less), an increase in pressure drop across the cathode current collector 5 can be inhibited to the extent that the performance of the fuel cell 100 is not significantly degraded.

The sealing member 8 that isolates the fuel channel 6 and the oxidant channel 7 from each other is disposed in such a manner that a main surface of the sealing member 8 opposite the anode 1 faces the second extension portion 2a and the first pressing member 20. That is, the sealing member 8 is disposed so as to extend from the second extension portion 2a to an end face S of the first pressing member 20 on the side of the anode 1. The cathode current collector 5 is disposed so as to cover the sealing member 8.

At least part of the outer edge portion 8a of the sealing member 8 together with at least part of the third extension portion 5a is held between the first pressing member 20 and the second pressing member 30. The first pressing member 20 and the second pressing member 30 are pressed from the outside in the thickness direction of the cell structure 4 in this state, thus resulting in improved sealing properties. Accordingly, the fuel and the oxidant are prevented from coming into contact with each other in the gap 6a or 7a. The third extension portion 5a may be in direct contact with the second pressing member 30 or may be in contact with the second pressing member 30 with another member.

In the inner edge portion 8b of the sealing member 8, a main surface thereof on the side of the anode faces the second extension portion 2a, and a main surface opposite the main surface on the side of the anode faces the body portion 5b of the cathode current collector 5. When the first pressing member 20 and the second pressing member 30 are pressed from the outside in the thickness direction of the cell structure 4 in this state, the second extension portion 2a and the body portion 5b are brought into close contact with each other with the inner edge portion 8b of the sealing member 8 interposed therebetween. This inhibits the cross leakage phenomenon. The boundary between the outer edge portion 8a and the inner edge portion 8b of the sealing member 8 is represented by the broken line L2.

Figure 3:
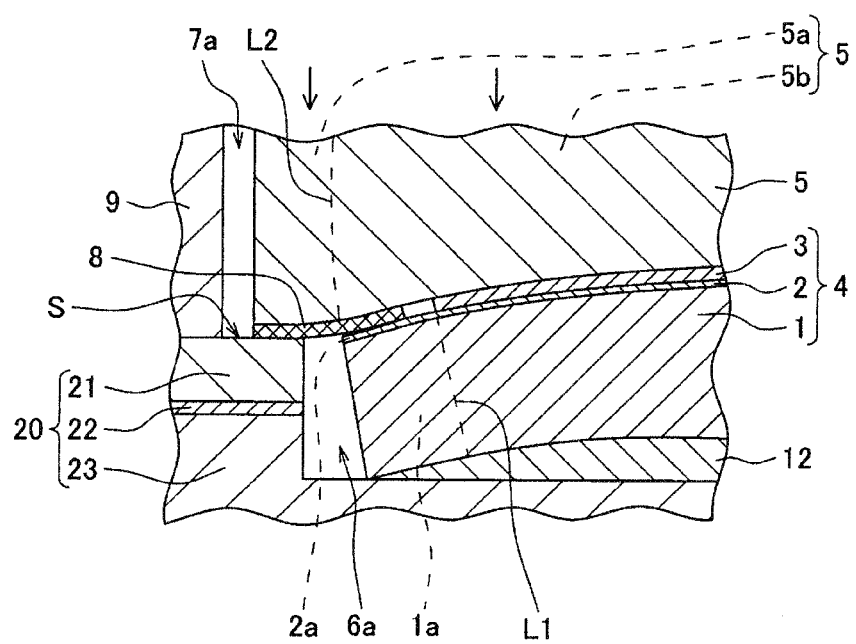
FIG. 3 is a schematic cross-sectional view illustrating a main portion of a fuel cell according to another embodiment of the present invention.

As illustrated in FIG. 3, even if the cell structure 4 is warped, the sealing member 8 can be in close contact with the end face S of the first pressing member 20. The cathode current collector 5 is formed of a porous metal body having a three-dimensional mesh-like skeleton and thus deforms so as to follow the shape of the cell structure 4 warped. This results in good sealing properties and improved electrical conduction between the cathode 3 and the cathode current collector 5. In this case, the use of the anode current collector 12 formed of a porous metal body having a three-dimensional mesh-like skeleton similarly to the cathode current collector 5 permits the anode current collector 12 to deform so as to follow the shape of the anode 1, thus maintaining a state in which the anode 1 and the anode current collector 12 are in contact with each other with a large contact area. This results in improved electrical conduction between the anode 1 and the anode current collector 12.

(Current Collector)

The cathode current collector 5 according to the embodiment is formed of the porous metal body having a three-dimensional mesh-like skeleton. The anode current collector 12 is preferably formed of a porous metal body having a three-dimensional mesh-like skeleton similarly to the cathode current collector 5. Such a porous metal body has, for example, a nonwoven fabric-like structure or sponge-like structure. Such a structure has pores and a metal skeleton. For example, a porous metal body having a sponge-like structure is formed of cells having pores and a metal skeleton.

Figure 4:
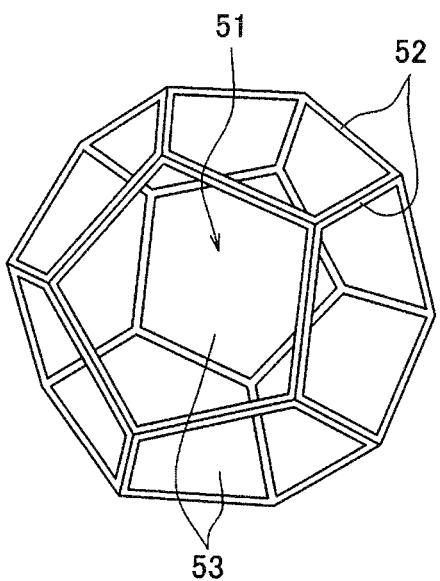
FIG. 4 is a schematic view illustrating an example of the structure of part of the skeleton of a porous metal body.

One of the cells can be expressed as, for example, a rhombic dodecahedron as illustrated in FIG. 4. Pores 51 are defined by fibrous or rod-like metal portions (fibrous portions 52) and are connected together in a three-dimensional manner. The skeleton of the cells is formed by the connection of the fibrous portions 52. The cells include openings 53 (or windows) 53, having a substantially pentagonal shape, surrounded by the fibrous portions 52. Adjacent cells share one of the openings 53 to communicate with each other.

That is, the skeleton of the porous metal body is formed of the fibrous portions 52 that define continuous pores 51 and that form a mesh-like network. The skeleton having the structure is referred to as the "three-dimensional mesh-like skeleton". FIG. 4 schematically illustrates an example of the structure of part of the skeleton of the porous metal body.

Figure 5:
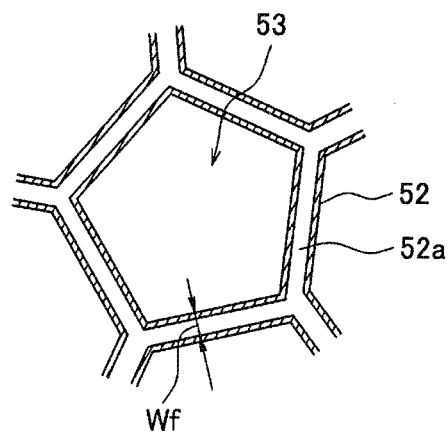
FIG. 5 is a schematic cross-sectional view illustrating a cross section of the part of the skeleton illustrated in FIG. 4.

As illustrated in FIG. 5, each of the fibrous portions 52 may have a cavity 52a therein, i.e., may be hollow. The porous metal body having a hollow skeleton is extremely light while having a bulky three-dimensional structure. FIG. 5 is a schematic cross-sectional view illustrating a cross section of part of the skeleton in FIG. 4.

Such a porous metal body can be formed by, for example, coating a porous resin body having a continuous pore with a metal. The coating with the metal can be performed by, for example, plating treatment, a gas-phase method (such as evaporation, plasma-enhanced chemical vapor deposition, or sputtering), or the application of a metal paste.

The three-dimensional mesh-like skeleton is formed by the coating treatment with the metal. Among these coating methods, the plating treatment is preferred.

Regarding the plating treatment, a metal layer only needs to be formed on the surface of the porous resin body (including a surface of the cavity therein, and a known plating treatment method, for example, an electroplating method or a molten salt plating method. A three-dimensional mesh-like porous metal body corresponding to the shape of the porous resin body is formed by the plating treatment. In the case where an alloy coating film is formed, the alloy layer may be formed by separately forming metal coating layers by plating treatment and then heat-treating the metal films in a reducing atmosphere to diffuse the metals in the coating layers.

When the plating treatment is performed by the electroplating method, a conductive layer is preferably formed before the electroplating. The conductive layer may be formed on the surface of the porous resin body by electroless plating, evaporation, sputtering, or the application of a conductive agent, or may be formed by immersing the porous resin body in a dispersion containing a conductive agent.

The porous resin body is not particularly limited as long as it has a continuous pore. A resin foam, a nonwoven fabric composed of a resin, or the like may be used therefor. In particular, the resin foam is preferred from the viewpoint of easily forming the continuous pore in the porous metal body to be obtained. As a resin contained in these porous bodies, a resin is preferred such that after metal coating treatment, the inner portion of a three-dimensional mesh-like metal skeleton can be made hollow by decomposition or dissolution while the shape of the skeleton is maintained. Examples thereof include thermosetting resins such as thermosetting polyurethane and melamine resins; and thermoplastic resins such as olefin resins (e.g., polyethylene and polypropylene) and thermoplastic polyurethane. Among these, thermosetting polyurethane or the like is preferably used from the viewpoint of easily forming pores that are more uniform in size and shape.

Preferably, the resin in the skeleton is decomposed or dissolved by, for example, heat treatment and then removed by, for example, washing. The resin may be removed by heat treatment while a voltage is appropriately applied thereto, as needed. The heat treatment may be performed while a voltage is applied in a state in which the porous body that has been subjected to plating treatment is immersed in a molten salt plating bath. The resulting porous metal body has a skeleton having a three-dimensional mesh-like skeleton corresponding to the shape of a resin foam.

A metal contained in each of the current collector is not limited. Examples of the metal include copper, copper alloys (alloys of copper and, for example, iron (Fe), nickel (Ni), silicon (Si), or manganese (Mn)), Ni, Ni alloys (alloys of Ni and, for example, tin (Sn), chromium (Cr), or tungsten (W)), aluminum (Al), Al alloys (alloys of Al and, for example, Fe, Ni, Si, or Mn), and stainless steel. As a commercially available porous metal body, "Celmet" (registered trademark) of copper or nickel or "Aluminum-Celmet" (registered trademark), available from Sumitomo Electric Industries Co., Ltd., can be used.

In particular, the cathode current collector 5 preferably contains an alloy of Ni and Sn (Ni—Sn alloy) in view of ease of deformation. The percentage of Sn in the alloy is not particularly limited. In particular, Sn preferably accounts for 5% to 30% by mass, more preferably 5% to 20% by mass of the alloy in view of deformability and the retention of strength. Although the Ni—Sn alloy may contain an element other than Ni or Sn, the content of the element is preferably minimized as much as possible (for example, 3% by mass or less). The Ni—Sn alloy containing Sn in the foregoing percentage is preferably used for a PCFC that operates in an intermediate temperature range in view of corrosion resistance. As the anode current collector 12, a porous metal body composed of Ni may be used.

The porous metal body has a specific surface area (BET specific surface area) of, for example, 100 to 9,000 $m^2/m^3$, preferably 200 to 6,000 m²/m³. The density of the openings 53 (cell density) is, for example, 10 to 100 openings/2.54 cm, preferably 30 to 80 openings/2.54 cm. The term "cell density" refers to the number of the openings 53 present on a line that has a length of 1 inch (=2.54 cm) and that is drawn on a surface of the porous metal body. The width Wf of each of the fibrous portions 52 is not particularly limited. The width Wf is, for example, 3 to 500 μm, preferably 10 to 500 μm.

The porosity of the porous metal body is not particularly limited. In particular, the porous metal body used as the cathode current collector 5 preferably has a porosity of 80% or more by volume, more preferably 85% or more by volume, particularly preferably 90% or more by volume in view of its low pressure drop and ease of deformation. The cathode current collector 5 may have a porosity of less than 100% by volume, 99.5% or less by volume, or 99% or less by volume. These lower limits and the upper limits may be freely combined together. In particular, the porous metal body preferably has a porosity of 90% or more by volume and 99% or less by volume. The porosity (% by volume) is determined by {1−(apparent specific gravity of porous metal body/true specific gravity of metal)}×100.

The thickness of the cathode current collector 5 is not particularly limited. In particular, the cathode current collector 5 preferably has a thickness T of 0.1 to 5 mm, more preferably 1 to 3 mm in view of a pressure drop and ease of the absorption of warpage of the cell structure. The thickness T is defined by the average of measurement values when the thickness of the cathode current collector 5 in the normal direction to a main surface thereof is measured at freely-selected 10 points. The thickness of the anode current collector 12 is not particularly limited and may be, for example, 0.1 to 5 mm.

(Sealing Member)

The sealing member 8 is formed of a frame-shaped body that surrounds the cathode 3 and that has a predetermined width and a predetermined thickness.

A material for the sealing member 8 is not particularly limited and is preferably stainless steel because of its heat resistance at an operating temperature of the fuel cell, good gas barrier properties, and moderate deformability (plastically or elastically deformable to some extent).

The size of the sealing member 8 may be appropriately set, depending on the size of the cathode 3, the first pressing member 20, and the second pressing member 30. The internal dimension of the sealing member 8 (the size of an opening inside thereof) only needs to be a size to the extent that the entire cathode 3 is contained in the opening inside the sealing member 8. In particular, the sealing member 8 preferably has an internal dimension so as to face most of the second extension portion 2a (for example, 80% or more) from the viewpoint of inhibiting the cross leakage phenomenon. In particular, the entire second extension portion 2a faces the sealing member 8. The sealing member 8 may have an external dimension to the extent that when the sealing member 8 is disposed so as to surround the cathode 3, the outer edge portion 8a of the sealing member 8 faces the end face S of the first pressing member 20. Preferably, the external dimension of the sealing member 8 is equal to or larger than that of the cathode current collector 5 from the viewpoint of further improving the sealing properties. The thickness of the sealing member 8 may be appropriately set so as to be substantially equal to the thickness of the cathode 3.

(Pressing Member)

The first pressing member 20 and the second pressing member 30 are not particularly limited as long as at least part of the sealing member 8 can be held therebetween. The first pressing member 20 and the second pressing member 30 are pressed from the outside in the thickness direction of the cell structure 4 to reliably come into close contact with the sealing member 8. This isolates the fuel channel 6 and the oxidant channel 7 from each other.

The first pressing member 20 and the second pressing member 30 may be formed of, for example, a pair of interconnectors. Alternatively, as illustrated in FIG. 1, the first pressing member 20 may include a spacer 21, an insulating member 22, and an interconnector 23, and the second pressing member 30 may serve as an interconnector 31. The insulating member 22 may be interposed between the sealing member 8 and the interconnector 23 or the interconnector 31 and is not limited to the position illustrated in FIG. 1. In the case of FIG. 1, by pressing the interconnector 23 and the interconnector 31 from the outside in the thickness direction of the cell structure 4, the spacer 21 and the cathode current collector 5 come into close contact with the sealing member 8 to achieve good sealing properties.

(Spacer)

The spacers (21, 9) are formed of frame-shaped bodies disposed between the interconnector 23 and the sealing member 8 and around the cathode current collector 5, as needed. The material thereof is not particularly limited and is, for example, an iron-chromium (FeCr) alloy. Each spacer may be used as one of the elements of the pressing members between which the sealing member 8 is held.

(Insulating Member)

The insulating member 22 is formed of a frame-shaped body interposed between the interconnectors (23, 31) in order to prevent a short circuit. The material thereof is not particularly limited as long as it is an insulating material. Examples thereof include mica and aluminum oxide. As the insulating member 22, a frame-shaped insulating material may be used. Alternatively, in the case of an embodiment illustrated, the insulating member 22 may be formed by applying a coating material containing an insulating material to an end face of the spacer 21 or the interconnector 23. The insulating member may be used as one of the elements of the pressing members between which the sealing member 8 is held.

(Interconnector)

The interconnectors (23, 31) are disposed on both sides of the cell structure 4 and function as current collectors. Each of the interconnectors may be used as one of the elements of the pressing members between which the sealing member 8 is held.

As illustrated in FIG. 1, the interconnectors (23, 31) may include the fuel channel 6 and the oxidant channel 7, respectively. In this case, the cell structures 4 stacked may be connected together in series using interconnectors each including the fuel channel 6 and the oxidant channel 7 on the respective surfaces thereof. The interconnector 31 need not include the oxidant channel 7, and the oxidant may be directly supplied from the manifold 11 to the cathode current collector 5. The cathode current collector 5 has a high porosity and good gas diffusivity and thus functions as a gas channel. Similarly, the interconnector 23 need not include the fuel channel 6, and the fuel may be directly supplied from a manifold (not illustrated) to the anode current collector 12. In this case, similarly to the cathode current collector 5, a porous metal body having a three-dimensional mesh-like skeleton is preferably used as the anode current collector 12 in view of gas diffusivity.

Examples of a material for the interconnectors (23, 31) include stainless steel and heat-resistant alloys such as nickel-based alloys and chromium-based alloys in view of conductivity and heat resistance. In the case of a PCFC, because the operating temperature is about 400° C. to about 600° C., inexpensive stainless steel can be used as the material of the interconnectors (23, 31).

(Cell Structure)

The cell structure 4 includes the anode 1, the cathode 3, and the electrolyte layer 2 interposed between the anode 1 and the cathode 3. The anode 1, the cathode 3, and the electrolyte layer 2 are integrated together by, for example, sintering.

(Electrolyte Layer)

The electrolyte layer 2 contains an ionically conductive solid oxide. Ions that migrate in the electrolyte layer 2 are not particularly limited and may be oxide ions or hydrogen ions (protons). In particular, the electrolyte layer 2 preferably has proton conductivity. Protonic ceramic fuel cells (PCFCs) can operate in an intermediate temperature range of, for example, 400° C. to 600° C. Thus, PCFCs can be used for various applications.

An example of the ionically conductive solid oxide is zirconium dioxide (stabilized zirconia) doped with at least one selected from the group consisting of calcium, scandium, and yttrium. In particular, yttria-stabilized zirconia ($ZrO_2$—$Y_2O_3$, YSZ) is preferred in view of oxide-ion conductivity and cost.

An example of a protonically conductive solid oxide is a metal oxide that has a perovskite structure represented by $ABO_3$ and that is represented by formula (1):

$$A_aB_bM_cO_{3-\delta}$$

(where element A is at least one selected from the group consisting of Ba, Ca, and Sr, element B is at least one selected from the group consisting of Ce and Zr, element M is at least one selected from the group consisting of Y, Yb, Er, Ho, Tm, Gd, and Sc, $0.85 \leq a \leq 1$, $0.5 \leq b < 1$, $c=1-b$, and $\delta$ represents an oxygen vacancy concentration).

Examples of the metal oxide include metal oxides such as yttrium-doped barium zirconate (BZY, $BaZr_{1-e}Y_eO_{3-\delta}$, $0.05 \leq e \leq 0.25$, $\delta$ represents an oxygen vacancy concentration), yttrium-doped barium cerate (BCY, $BaCe_{1-f}Y_fO_{3-\delta}$, $0.05 \leq f \leq 0.25$, $\delta$ represents an oxygen vacancy concentration), and an yttrium-doped mixed oxide barium zirconate/barium cerate (BZCY, $BaZr_{1-g-h}Ce_gY_hO_{3-\delta}$, $0 < g < 1$, $0.05 \leq h \leq 0.25$, $\delta$ represents an oxygen vacancy concentration).

Even if the electrolyte layer 2 contains BZY, BCY, or BZCY, which provides a relatively low-strength sintered body, the use of the cathode current collector 5 can improve the sealing properties without damaging the cell structure 4. The thickness of the electrolyte layer 2 is not particularly limited and is preferably about 5 μm to about 100 μm because a low resistance is provided.

(Cathode)

The cathode 3 has a porous structure on which oxygen molecules can be adsorbed, dissociated, and ionized. As a material for the cathode 3, for example, known materials used for cathodes of fuel cells can be used. A material for the cathode 3 is, for example, a compound containing lanthanum and having a perovskite structure. Specific examples thereof include lanthanum strontium cobalt ferrite (LSCF, $La_{1-a}Sr_aFe_{1-b}Co_bO_{3-\delta}$, $0.2 \leq a \leq 0.8$, $0.1 \leq b \leq 0.9$, and $\delta$ represents an oxygen vacancy concentration), lanthanum strontium manganite (LSM, $La_{1-c}Sr_cMnO_{3-\delta}$, $0.2 \leq c \leq 0.8$, and $\delta$ represents an oxygen vacancy concentration), and lanthanum strontium cobaltite (LSC, $La_{1-HR}Sr_{HR}CoO_{3-\delta}$, $0.2 \leq HR \leq 0.8$, and $\delta$ represents an oxygen vacancy concentration).

The cathode 3 may contain a catalyst such as nickel, iron, or cobalt. In the case where the catalyst is contained, the cathode can be formed by mixing the catalyst with the material described above and sintering the resulting mixture. The thickness of the cathode 3 is not particularly limited and may be about 5 μm to about 100 μm.

(Anode)

The anode 1 has an ionically conductive porous structure. For example, at the protonically conductive anode 1, a reaction in which a fuel such as hydrogen introduced from the fuel channel 6 is oxidized to release protons and electrons (an oxidation reaction of the fuel) occurs. The anode 1 may have a thickness of, for example, about 10 μm to about 1,000 μm.

As a material for the anode 1, for example, known materials used for anodes of fuel cells can be used. A specific example thereof is a composite oxide of a metal oxide exemplified as the solid oxide used for the electrolyte layer 2 and nickel oxide (NiO) serving as a catalytic component. The anode 1 containing the composite oxide can be formed by, for example, mixing a NiO powder with the powdery metal oxide described above and sintering the resulting mixture.

(Method for Producing Cell Structure)

A method for producing the cell structure 4 is not particularly limited, and a known method can be employed.

For example, the cell structure can be produced by a method including the steps of press-forming an anode material, depositing an electrolyte material containing a solid oxide on a side of the resulting anode green body and performing sintering, and depositing a cathode material on a surface of the sintered electrolyte material and performing sintering. In the case of the cell structure 4 thus produced, the anode 1, the electrolyte layer 2, and the cathode 3 are integrated together.

In the step of depositing the electrolyte material, for example, a paste prepared by mixing the powder of the electrolyte material with a water-soluble binder resin is applied to the side of the anode green body by, for example, screen printing, spray coating, spin coating, or dip coating. Similarly, the cathode material can also be deposited on the surface of the electrolyte.

The sintering of the electrolyte material is performed by heating the stack of the anode green body and the electrolyte material to, for example, 1,300° C. to 1,500° C. in an oxygen atmosphere. The oxygen concentration in the sintering atmosphere is not particularly limited, and may be 50% or more by volume or 60% or more by volume. The heating temperature is preferably 1,350° C. to 1,450° C. The sintering can be performed at atmospheric pressure or under pressure.

Before the electrolyte material is deposited, the anode material may be subjected to preliminarily sintering. The preliminary sintering may be performed at a lower temperature (for example, 900° C. to 1,100° C.) than the temperature at which the anode material is sintered. By performing the preliminary sintering, the electrolyte material is easily deposited.

Before the electrolyte material is sintered, a resin component such as a binder contained in each material may be removed. That is, after the cathode material is deposited, heating is performed at a relatively low temperature of about 500° C. to about 800° C. in air to remove the resin component contained in each material. Then the resulting stack may be heated to 1,300° C. to 1,500° C. in an oxygen atmosphere to sinter the materials.

In the sintering of the cathode material, the stack of the cathode material and the formed anode body including the electrolyte layer deposited thereon is sintered at, for example, 800° C. to 1,100° C. in an oxygen atmosphere. The oxygen concentration in the sintering atmosphere is not particularly limited and, for example, may be in the range described above. The sintering can be performed at atmospheric pressure or under pressure.

Here, the porous metal body having the three-dimensional mesh-like skeleton described above can also be appropriately used for the production of hydrogen by water electrolysis (electrolyzation) in addition to fuel cells. Methods for producing hydrogen are broadly categorized as follows: (1) an alkaline water electrolysis method using an alkaline aqueous solution, (2) a polymer electrolyte membrane (PEM) method, and (3) a solid oxide electrolysis cell (SOEC) method. The porous metal body can be used for any of the methods.

(1) In the alkaline water electrolysis method, water is electrolyzed by immersing an anode and a cathode in an alkaline aqueous solution (preferably a strongly alkaline aqueous solution) and applying a voltage between the anode and the cathode. In this case, the porous metal body is used as at least the anode. That is, an apparatus for producing hydrogen by the alkaline water electrolysis method includes an electrolytic bath that contains an alkaline aqueous solution, an anode and a cathode that are immersed in the electrolytic bath, and a power supply that applies a voltage between the anode and the cathode, at least one of the anode and the cathode including a porous metal body having a three-dimensional mesh-like skeleton. At the anode of the apparatus for producing hydrogen, hydroxyl ions are oxidized to form oxygen and water. At the cathode, hydrogen ions are reduced to generate hydrogen. Because the porous metal body has a large surface area, the area of contact between the porous metal body and the ions is large, thus improving the efficiency of water electrolysis. The porous metal body has good conductivity, thus further improving the efficiency of water electrolysis. Because the porous metal body has high porosity, hydrogen and oxygen generated can be rapidly detached. Also in this respect, the efficiency of water electrolysis should be improved.

A metal contained in the porous metal body is not particularly limited. Examples thereof include the same metals as the examples of the metal contained in the foregoing current collectors. In particular, the porous metal body used for the cathode preferably contains Ni or a Ni alloy because it is inexpensive and has a good ability to catalyze a hydrogen evolution reaction. The porous metal body used for the anode preferably contains platinum in view of catalytic activity.

The porous metal body preferably has a cell size of 100 μm or more and 5,000 μm or less. When the cell size of the porous metal body is in the range described above, hydrogen or oxygen generated at each electrode can be rapidly detached; thus, the electrolysis efficiency is further improved, and a sufficient area of contact between each electrode and hydrogen ions or hydroxyl ions can be ensured. From a similar point of view, the porous metal body preferably has a cell size of 400 μm or more and 4,000 μm or less. To achieve both good detachability of bubbles and a large contact area, a combination of the porous metal bodies having different cell sizes may be used as each electrode.

Furthermore, a porous body composed of another metal may be used in combination with the porous metal body. The thickness and the mass (amount of metal) per unit area of the porous metal body may be appropriately set, depending on the scale of the production apparatus. For example, the thickness, the mass per unit area, and so forth may be set so as not to cause deformation or the like, depending on the area of a main surface of each electrode.

To prevent the mixing of hydrogen and oxygen generated, a separator is preferably disposed between the anode and the cathode. A material for the separator is not particularly limited and only needs to have wettability, ion permeability, alkali resistance, non-conductivity, non-air-permeability, thermal stability, and so forth. Examples of the material for the separator include fluororesins impregnated with potassium titanate, polyantimonic acid, polysulfone, hydrophilized polyphenylene sulfide, poly(vinylidene fluoride), and polytetrafluoroethylene. When stacked cells each including an anode, a cathode, and a separator are used, preferably, such separators are also disposed between the cells from the viewpoint of preventing a short circuit.

A solute for the alkaline aqueous solution is not particularly limited. Examples thereof include hydroxides and so forth of alkali metals (lithium, sodium, potassium, rubidium, cesium, and francium) and hydroxides and so forth of alkaline-earth metals (calcium, strontium, barium, and radium). Among these, hydroxides of alkali metals (in particular, NaOH and KOH) are preferred because strongly alkaline aqueous solutions are obtained. The concentration of the alkaline aqueous solution is not particularly limited and may be 20% to 40% by mass in view of electrolysis efficiency. The operating temperature is, for example, about 60° C. to about 90° C. The current density is, for example, about 0.1 to about 0.3 A/cm$^2$.

(2) The PEM method is a method for electrolyzing water with a polymer electrolyte membrane. Specifically, in the PEM method, water is electrolyzed by arranging an anode and a cathode on the respective sides of the polymer electrolyte membrane and applying a voltage between the anode and the cathode while water is introduced into the anode.

In this case, the porous metal body is used as at least the anode. That is, an apparatus for producing hydrogen by the PEM method (PEM-type hydrogen production apparatus) includes an anode, a cathode, and a polymer electrolyte membrane interposed between the anode and the cathode, and a power supply that applies a voltage between the anode and the cathode, the cathode at least including a porous metal body that has a three-dimensional mesh-like skeleton. The PEM method has the advantage that because the anode side and the cathode side are completely isolated by the polymer electrolyte membrane, hydrogen having higher purity than that in (1) alkaline water electrolysis method is produced. The porous metal body has a large surface area and good conductivity. Thus, the porous metal body can be appropriately used as an anode for use in the PEM-type hydrogen production apparatus.

Protons generated with the PEM-type hydrogen production apparatus move to the cathode through the polymer electrolyte membrane and are taken out as hydrogen on the side of the cathode. That is, although the PEM-type hydrogen production apparatus uses a completely opposite reaction that used in a polymer electrolyte fuel cell, in which hydrogen and oxygen are reacted to generate electricity and to discharge water, the apparatus has the same structure as the fuel cell. The PEM-type hydrogen production apparatus has an operating temperature of about 100° C. As the polymer electrolyte membrane, a protonically conductive polymer such as a perfluorosulfonic acid polymer, which has been used for solid polymer electrolyte fuel cells or PEM-type hydrogen production apparatuses, can be used. Preferably, the cathode also includes the porous metal body because hydrogen generated can be rapidly detached.

A metal contained in the porous metal body is not particularly limited. Examples thereof include the same metals as the examples of the metal contained in the foregoing current collectors. In particular, the porous metal body used for the anode preferably contains Ni or a Ni alloy because it is inexpensive and has a good ability to catalyze a hydrogen evolution reaction. The porous metal body used for the cathode preferably contains rhodium in view of catalytic activity.

The porous metal body preferably has a cell size of 100 µm or more and 5,000 µm or less. When the cell size of the porous metal body is in the range described above, hydrogen or oxygen generated at each electrode can be rapidly detached; thus, the electrolysis efficiency is further improved, and water retentivity are enhanced. In particular, if the anode has low water retentivity, water passes therethrough before water reacts sufficiently with the anode, thereby easily decreasing the electrolysis efficiency.

From a similar point of view, the porous metal body preferably has a cell size of 400 µm or more and 4,000 µm or less. A combination of the porous metal bodies having different cell sizes may be used as each electrode in consideration of the detachability of bubbles, water retentivity, and electrical connection. Furthermore, a porous body composed of another metal may be used in combination with the porous metal body.

The thickness and the mass per unit area of the porous metal body may be appropriately set, depending on the scale of the production apparatus. In particular, the thickness and the mass per unit area are preferably adjusted in such a manner that the porous metal body has a porosity of 30% or more. This is because the use of the porous metal body having a porosity of less than 30% increases the pressure drop when water flows through the porous metal body.

In this method, the polymer electrolyte membrane and both electrodes are subjected to pressure bonding to establish electrical continuity.

Thus, the mass per unit area is preferably adjusted in such a manner that an increase in electrical resistance due to the deformation and creep of both electrodes during the pressure bonding thereof is in the range where no problem arises in practical use. The mass of the porous metal body per unit area is preferably 400 g/m$^2$ or more.

(3) The SOEC method (also called as water vapor electrolysis method) is a method for electrolyzing water vapor with a solid oxide electrolyte membrane. Specifically, in the SOEC method, water is electrolyzed by arranging an anode and a cathode on the respective sides of the solid oxide electrolyte membrane and applying a voltage between the anode and the cathode while water vapor is introduced into one of the electrodes.

In the SOEC method, an electrode into which water vapor is introduced varies, depending on whether the solid oxide electrolyte membrane is proton conductive or oxide-ion conductive. When the solid oxide electrolyte membrane is oxide-ion conductive, water vapor is introduced into the cathode. The water vapor is decomposed at the cathode to generate protons and oxide ions. The protons generated are reduced at the cathode and taken out in the form of hydrogen. After the oxide ions move to the anode through the solid oxide electrolyte membrane, the oxide ions are oxidized at the anode and taken out in the form of oxygen. When the solid oxide electrolyte membrane is proton conductive, water vapor is introduced into the anode. The water vapor is decomposed at the anode to generate protons and oxide ions. After the protons generated move to the cathode thorough the solid oxide electrolyte membrane, the protons are reduced and taken out in the form of hydrogen. The oxide ions are oxidized at the anode and taken out in the form of oxygen.

In the SOEC method, the porous metal body is used as an electrode into which water vapor is introduced. That is, an apparatus for producing hydrogen by the SOEC method (SOEC-type hydrogen production apparatus) includes an anode, a cathode, a solid oxide electrolyte membrane interposed between the anode and the cathode, and a power supply that applies a voltage between the anode and the cathode, in which at least an electrode into which water vapor is introduced includes a porous metal body having a three-dimensional mesh-like skeleton. Because the porous metal body has a large surface area, the area of contact between water vapor and the electrode is large, thus improving the efficiency of water electrolysis. The porous metal body has good conductivity, thus further improving the electrolysis efficiency of water vapor.

From the viewpoint of easily producing high-pure hydrogen, the solid oxide electrolyte membrane is preferably proton conductive. This is because when the solid oxide electrolyte membrane is proton conductive, an electrode into which water vapor is introduced differs from an electrode from which hydrogen is taken. In this case, the porous metal body is used for the anode. From the viewpoint of rapidly detaching hydrogen generated, in this case, the cathode also preferably includes the porous metal body.

Although the SOEC-type hydrogen production apparatus uses a completely opposite reaction that used in a solid oxide fuel cell, in which hydrogen and oxygen are reacted to generate electricity and to discharge water, the apparatus has the same structure as the fuel cell. The SOEC-type hydrogen production apparatus has an operating temperature of about 600° C. to about 800° C. At the anode, oxygen is generated. Thus, the anode is placed in a high-temperature oxidizing atmosphere. The porous metal body has high oxidation resistance and thermal resistance and thus can be appropriately used for, in particular, the anode of the SOEC-type hydrogen production apparatus.

A metal contained in the porous metal body is not particularly limited. Examples thereof include the same metals as the examples of the metal contained in the foregoing current collectors. In particular, as the anode used in the oxidizing atmosphere, the porous metal body containing a Ni alloy that contains 3% to 30% by mass of a highly oxidation-resistant metal such as chromium (Cr) is preferably used. The porous metal body used for the cathode preferably contains Sn in view of electrical resistance.

The porous metal body preferably has a cell size of 100 µm or more and 5,000 µm or less. When the cell size of the porous metal body is in the range described above, the pressure drop of water vapor is in an appropriate range, thus increasing the electrolysis efficiency. When the porous metal body is used as the cathode, hydrogen generated can be rapidly detached. From a similar point of view, the porous metal body preferably has a cell size of 400 µm or more and 4,000 µm or less. A combination of the porous metal bodies having different cell sizes may be used as each electrode in consideration of the detachability of bubbles, water-vapor permeability, and electrical connection. Furthermore, a porous body composed of another metal may be used in combination with the porous metal body.

The thickness and the mass per unit area of the porous metal body may be appropriately set, depending on the scale of the hydrogen production apparatus. In particular, the thickness and the mass per unit area are preferably adjusted in such a manner that the porous metal body has a porosity of 30% or more. This is because the use of the porous metal body having a porosity of less than 30% increases the pressure drop when water flows through the porous metal body. In this method, the solid oxide electrolyte membrane and both electrodes are subjected to pressure bonding to establish electrical continuity. Thus, the mass per unit area is preferably adjusted in such a manner that an increase in electrical resistance due to the deformation and creep of both electrodes during the pressure bonding thereof is in the range where no problem arises in practical use.

The mass of the porous metal body per unit area is preferably 400 g/m$^2$ or more.

Figure 6:
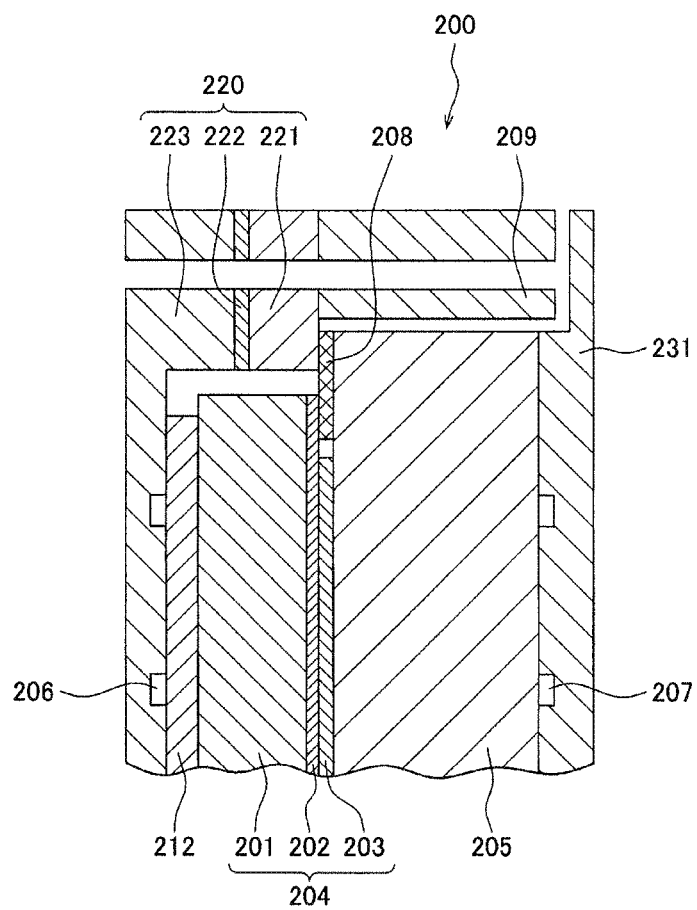
FIG. 6 is a schematic cross-sectional view illustrating the structure of a main portion of a hydrogen production apparatus using an SOEC process.

FIG. 6 is a schematic cross-sectional view of a main portion of an SOEC-type hydrogen production apparatus 200 including a protonically conductive solid oxide electrolyte membrane. In FIG. 6, a power supply is omitted. The hydrogen production apparatus 200 includes a structure 204 including a solid oxide electrolyte membrane 202, electrodes 205 and 212 facing respective main surfaces of the structure 204, plate-like members 231 and 223 facing the respective main surfaces of the electrodes 205 and 212 away from the structure 204, and a power supply (not illustrated).

Each of the electrodes 205 and 212 is formed of a porous metal body having a three-dimensional mesh-like skeleton as described above. The plate-like members 231 and 223 serve as interconnectors disposed in order not to mix water vapor, hydrogen, and oxygen, and include gas channels 207 and 206, respectively. Water vapor is introduced from the gas channel 206 of the plate-like member 223 to the electrode 212. Hydrogen generated is discharged through the gas channel 207. That is, the electrode 212 serves as an anode, the electrode 205 serves as a cathode.

The SOEC-type hydrogen production apparatus 200 has the same structure as the fuel cell 100 illustrated in FIG. 1, except that the power supply is provided. That is, the structure 204 includes solid oxide electrolyte membrane 202 containing a protonically conductive solid oxide, and porous layers 201 and 203 facing respective main surfaces thereof. The solid oxide electrolyte membrane 202 contains the same protonically conductive solid oxide as that exemplified for the electrolyte layer 2. The porous layers 201 and 203 support the solid oxide electrolyte membrane 202. The porous layer 201 has a larger outside diameter than the porous layer 203. The porous layer 201 supports the entire structure 204.

The porous layer 201 located on the side of the anode (electrode 212) is composed of a composite oxide of the solid oxide and nickel oxide (NiO) serving as a catalytic component, similarly to the anode 1. Thereby, the electrolysis efficiency is further enhanced. The porous layer 203 is composed of the same compound as that exemplified for the cathode 3.

The gas channels 206 and 207 are isolated from each other by a sealing member 208. The sealing member 208 is held between the electrode 205 and a pressing member 220 including a spacer 221, an insulating member 222, and the plate-like member 223. This results in improved sealing properties. In this case, the electrode 205 preferably contains the Ni—Sn alloy exemplified for the cathode current collector 5.

The structures of the plate-like member 223 and 231 correspond to the interconnectors 23 and 31, respectively, illustrated in FIG. 1. The structure of a spacer 209 corresponds to the spacer 9 illustrated in FIG. 1. The structures of other components illustrated in FIG. 6 correspond to the structures of the corresponding components illustrated in FIG. 1.

While the present invention will be more specifically described below by examples, the present invention is not limited to these examples.

Example 1

A fuel cell was produced by the following procedure.
(1) Production of Cell Structure First, a cell structure was produced by the following procedure.

BCY (BaCe$_{0.8}$Y$_{0.2}$O$_{2.9}$) was mixed with NiO to prepare a mixture containing 70% by volume Ni (catalytic component). The mixture was pulverized and mixed using a ball mill. Then the mixture was press-formed into a circular green body (thickness: about 600 μm) for an anode. The green body was subjected to preliminary sintering at 1,000° C. Subsequently, a paste containing BCY and a water-soluble binder resin (ethyl cellulose) was applied to one surface of the green body by screen printing. The water-soluble binder resin was removed at 750° C. Then co-sintering was performed by heat treatment at 1,400° C. to form a stack of a circular anode and a solid oxide layer (thickness: 30 μm, diameter: 100 mm).

Subsequently, an LSCF paste containing an LSCF (La$_{0.6}$HR$_{0.4}$Co$_{0.2}$Fe$_{0.8}$O$_{3-\delta}$) powder serving as a material for a cathode and the organic solvent was applied to a surface of the solid electrolyte layer by screen printing and fired at 1,000° C. for 2 hours to produce a cell structure A (thickness: 650 μm). The cathode had a thickness of 50 μm and a diameter of 90 mm.

The amount of warpage of the resulting cell structure A was 0.85 mm. The amount of warpage was defined as the shortest distance between a horizontal surface and a convex portion of the cell structure when the cell structure was placed on the horizontal surface with the convex portion of the cell structure facing up.
(2) Provision of Cathode Current Collector A circular porous metal body (mass per unit: 700 g/m$^2$, thickness: 1.5 mm, external dimension: 127 mm) composed of a Ni—Sn alloy (Sn content: 10% by mass) corresponding to Celmet (registered trademark) of item No. 8 (porosity: 95%) available from Sumitomo Electric Industries Co., Ltd., was provided.
(3) Provision of Sealing Member A circular ring, composed of ferrite-based stainless steel, having an external dimension of 127 mm, an internal dimension of 96 mm, and a thickness of 50 μm was provided.
(4) Production of Fuel Cell A fuel cell A illustrated in FIG. 1 was produced with the cell structure A, the cathode current collector, the sealing member, an anode current collector (Celmet (registered trademark) of nickel, item No. 8, thickness: 1.4 mm, porosity: 95%, available from Sumitomo Electric Industries Co., Ltd.), a pair of interconnectors, composed of stainless steel, including gas channels, spacers (material: an FeCr alloy), and an insulating member (mica). The resulting fuel cell A was placed with the anode side down. An open-circuit voltage (OCV) was measured with a load of 40 kPa applied from the cathode side. Table 1 lists the results.

Example 2

A fuel cell B was produced and evaluated as in Example 1, except that a cell structure B having an amount of warpage of 0.78 mm was used. Table 1 lists the results.

Example 3

A fuel cell C was produced and evaluated as in Example 1, except that a cell structure C having an amount of warpage of 0.83 mm was used. Table 1 lists the results.

Example 4

A fuel cell D was produced and evaluated as in Example 1, except that a cell structure D having an amount of warpage of 0.75 mm was used and the cathode current collector composed of a Ni—Sn alloy having a Sn content of 30% by mass was used. Table 1 lists the results.

Comparative Example 1

A fuel cell a was produced and evaluated as in Example 1, except that a cell structure a having an amount of warpage of 0.88 mm was used and that the spacer on the side of the cathode and the cathode current collector were not used. Table 1 lists the results.

Comparative Example 2

A fuel cell b was produced and evaluated as in Comparative example 1, except that a cell structure b having an amount of warpage of 0.75 mm was used. Table 1 lists the results.

Comparative Example 3

A fuel cell c was produced and evaluated as in Comparative example 1, except that a cell structure c having an amount of warpage of 0.95 mm was used. Table 1 lists the results.

TABLE 1

| | Fuel cell | | | | | | |
|---|---|---|---|---|---|---|---|
| | A | B | C | D | a | b | c |
| Amount of warpage of cell structure (mm) | 0.85 | 0.78 | 0.83 | 0.75 | 0.88 | 0.75 | 0.95 |
| OCV (V) | 1.078 | 1.088 | 1.091 | 1.039 | 1.022 | 1.035 | 0.983 |

The OCV is decreased by gas leakage and the damage of the cell structure. Each of the fuel cells a to c that do not include the cathode current collector has a low OCV and thus is suspected of suffering from one or both of gas leakage and the damage of the cell structure. In contrast, each of the fuel cells A to D has a high OCV and thus has no gas leakage or the damage of the cell.

REFERENCE SIGNS LIST

1 anode, 1a first extension portion, 2 electrolyte layer, 2a second extension portion, 3 cathode, 4 cell structure, 5 cathode current collector, 5a third extension portion, 5b body portion, 6 fuel channel, 6a gap, 7 oxidant channel, 7a gap, 8 sealing member 8b inner edge portion of sealing member 8a outer edge portion of sealing member, 9, 21 spacer, 11 manifold, 12 anode current collector, 20 first pressing member, 22 insulating member, 23, 31 interconnector, 30 second pressing member, 51 pore, 52 fibrous portion, 52a cavity, 53 opening, 100 fuel cell, 101 anode, 102 electrolyte layer, 103 cathode, 104 cell structure, 106 fuel channel, 106a gap, 107 oxidant channel, 107a gap, 108 sealing member, 109, 121 spacer, 111 manifold, 122 insulating member, 123, 131 interconnector, 110 fuel cell, 200 hydrogen production apparatus, 201, 203 porous layer, 202 solid oxide electrolyte membrane, 204 structure, 205, 212 electrode, 206, 207 gas channel, 208 sealing member, 209, 221 spacer, 220 pressing member, 222 insulating member, 231, 223 plate-like member

The invention claimed is:
1. A solid oxide fuel cell comprising:
a flat-plate-shaped cell structure including a cathode, an anode including a peripheral portion that is not opposite the cathode and having a larger outside diameter than the cathode, and an electrolyte layer interposed between the cathode and the anode, the electrolyte layer including a peripheral portion that does not face the cathode, the electrolyte layer containing a solid oxide;
a frame-shaped sealing member disposed so as to surround a periphery of the cathode, the sealing member having a larger outside diameter than the cathode;
a first pressing member and a second pressing member that hold the sealing member therebetween;
a flat-plate-shaped cathode current collector adjacent to the cathode, the flat-plate-shaped cathode current collector being formed of a porous metal body having a three-dimensional mesh-like skeleton; and
first and second interconnectors, the first interconnector disposed on a first side of the cell structure and including a fuel channel, and the second interconnector disposed on a second side of the cell structure opposite the first side and including an oxidant channel,
wherein the cathode current collector has a peripheral portion that is not opposite the anode,
an outer edge portion of a main surface of the sealing member adjacent to the anode faces the first pressing member,
an inner edge portion of the main surface of the sealing member adjacent to the anode faces the peripheral portion of the electrolyte layer,
an outer edge portion of a main surface of the sealing member opposite the main surface of the sealing member adjacent to the anode is opposite the second pressing member with the peripheral portion of the cathode current collector,
an inner edge portion of the main surface of the sealing member opposite the main surface of the sealing member adjacent to the anode faces a body portion of the cathode current collector other than the peripheral portion of the cathode current collector,
the peripheral portion of the cathode current collector includes an extension portion that is not opposite the anode, and
the first pressing member and the second pressing member hold the extension portion of the cathode current collector with the sealing member disposed between the first pressing member and the extension portion of the cathode current collector.

2. The solid oxide fuel cell according to claim 1, wherein the porous metal body constituting the cathode current collector has a porosity of 90% or more and 99% or less.

3. The solid oxide fuel cell according to claim 1, wherein an external dimension of the sealing member is equal to or greater than an external dimension of the cathode current collector.

4. The solid oxide fuel cell according to claim 1, wherein the solid oxide has proton conductivity.

5. The solid oxide fuel cell according to claim 4, wherein the solid oxide contains a metal oxide having a perovskite structure, the metal oxide being represented by formula (1):

$$A_aB_bM_cO_{3-\delta}$$

(where element A is at least one selected from the group consisting of Ba, Ca, and Sr, element B is at least one selected from the group consisting of Ce and Zr, element M is at least one selected from the group consisting of Y, Yb, Er, Ho, Tm, Gd, and Sc, $0.85 \leq a \leq 1$, $0.5 \leq b < 1$, $c = 1-b$, and $\delta$ represents an oxygen vacancy concentration).

6. The solid oxide fuel cell according to claim 1, wherein the porous metal body contains an alloy of nickel and tin.

7. The solid oxide fuel cell according to claim 6, wherein tin accounts for 5% to 30% by mass of the alloy.

8. The solid oxide fuel cell according to claim 1, wherein the outer edge portion of the main surface of the sealing member opposite the main surface of the sealing member adjacent to the anode is in contact with the extension portion of the cathode current collector.

9. The solid oxide fuel cell according to claim 1, wherein the extension portion of the cathode current collector is in contact with the second pressing member.

10. A solid oxide fuel cell comprising:
a flat-plate-shaped cell structure including a cathode, an anode including a peripheral portion that is not opposite the cathode and having a larger outside diameter than the cathode, and an electrolyte layer interposed between the cathode and the anode, the electrolyte layer including a peripheral portion that does not face the cathode, the electrolyte layer containing a solid oxide;
a frame-shaped sealing member disposed so as to surround a periphery of the cathode, the sealing member having a larger outside diameter than the cathode;
a first pressing member and a second pressing member that hold the sealing member therebetween;
a flat-plate-shaped cathode current collector adjacent to the cathode, the flat-plate-shaped cathode current collector being formed of a porous metal body having a three-dimensional mesh-like skeleton; and
first and second interconnectors, the first interconnector disposed on a first side of the cell structure and including a fuel channel, and the second interconnector disposed on a second side of the cell structure opposite the first side and including an oxidant channel,
wherein the cathode current collector has a peripheral portion that is not opposite the anode,
an outer edge portion of a main surface of the sealing member adjacent to the anode faces the first pressing member,
an inner edge portion of the main surface of the sealing member adjacent to the anode faces the peripheral portion of the electrolyte layer,
an outer edge portion of a main surface of the sealing member opposite the main surface of the sealing member adjacent to the anode is opposite the second pressing member with the peripheral portion of the cathode current collector,
an inner edge portion of the main surface of the sealing member opposite the main surface of the sealing member adjacent to the anode faces a body portion of the cathode current collector other than the peripheral portion of the cathode current collector,
the peripheral portion of the electrolyte layer includes an extension portion which is opposite the anode and is not opposite the cathode, and
the frame-shaped sealing member has a flat-frame shape and 80% or more of the area of the extension portion of the electrolyte layer faces the frame-shaped sealing member.

11. The solid oxide fuel cell according to claim 10, wherein the porous metal body constituting the cathode current collector has a porosity of 90% or more and 99% or less.

12. The solid oxide fuel cell according to claim 10, wherein an external dimension of the sealing member is equal to or greater than an external dimension of the cathode current collector.

13. The solid oxide fuel cell according to claim 10, wherein the solid oxide has proton conductivity.

14. The solid oxide fuel cell according to claim 13, wherein the solid oxide contains a metal oxide having a perovskite structure, the metal oxide being represented by formula (1):

$$A_aB_bM_cO_{3-\delta}$$

(where element A is at least one selected from the group consisting of Ba, Ca, and Sr, element B is at least one selected from the group consisting of Ce and Zr, element M is at least one selected from the group consisting of Y, Yb, Er, Ho, Tm, Gd, and Sc, $0.85 \leq a \leq 1$, $0.5 \leq b < 1$, $c = 1-b$, and $\delta$ represents an oxygen vacancy concentration).

15. The solid oxide fuel cell according to claim 10, wherein the porous metal body contains an alloy of nickel and tin.

16. The solid oxide fuel cell according to claim 15, wherein tin accounts for 5% to 30% by mass of the alloy.

17. The solid oxide fuel cell according to claim 10, wherein
the peripheral portion of the cathode current collector includes an extension portion that is not opposite the anode, and
the outer edge portion of the main surface of the sealing member opposite the main surface of the sealing member adjacent to the anode is in contact with the extension portion of the cathode current collector.

18. The solid oxide fuel cell according to claim 10, wherein
the peripheral portion of the cathode current collector includes an extension portion that is not opposite the anode, and
the extension portion of the cathode current collector is in contact with the second pressing member.

* * * * *